US012686828B2

(12) United States Patent　　　　(10) Patent No.:　US 12,686,828 B2
Pontes Bittencourt　　　　　　　　　　(45) Date of Patent:　　Jul. 21, 2026

(54) PROCESS FOR THE INTEGRATED PRODUCTION OF H₂ AND AVIATION KEROSENE FROM A RENEWABLE RAW MATERIAL

(71) Applicant: Petróleo Brasileiro S.A.—Petrobras, Rio de Janeiro (BR)

(72) Inventor: Roberto Carlos Pontes Bittencourt, Rio de Janeiro (BR)

(73) Assignee: Petróleo Brasileiro S.A.—Petrobras, Rio de Janeiro (BR)

( * ) Notice: Subject to any disclaimer, the term of this patent is extended or adjusted under 35 U.S.C. 154(b) by 1015 days.

(21) Appl. No.: 17/885,792

(22) Filed: Aug. 11, 2022

(65) Prior Publication Data

US 2023/0049829 A1　　Feb. 16, 2023

(30) Foreign Application Priority Data

Aug. 11, 2021　(BR) ..................... 10 2021 015852 2

(51) Int. Cl.
*C10G 67/02*　　　　(2006.01)
*C01B 3/38*　　　　(2026.01)
*C10L 1/08*　　　　(2006.01)

(52) U.S. Cl.
CPC ................ *C10G 67/02* (2013.01); *C01B 3/38* (2013.01); *C10L 1/08* (2013.01);
(Continued)

(58) Field of Classification Search
CPC ............ C10G 67/02; C10G 2300/1014; C10G 2300/1018; C10G 2300/4081;
(Continued)

(56) References Cited

U.S. PATENT DOCUMENTS

| | | | |
|---|---|---|---|
| 7,846,323 B2 | 12/2010 | Abhari et al. | |
| 8,039,682 B2 | 10/2011 | Mccall et al. | |
| 8,043,600 B2 | 10/2011 | Knudsen et al. | |
| 8,912,375 B2 | 12/2014 | Egeberg et al. | |
| 2005/0187415 A1* | 8/2005 | Lawson ................... | C10K 1/08 |
| | | | 585/324 |

(Continued)

FOREIGN PATENT DOCUMENTS

WO　　2009151690 A2　12/2009
WO　　2020083998 A1　4/2020

OTHER PUBLICATIONS

Gutiérrez-Antonio et al. (Nov. 2017) "A Review on the Production Processes of Renewable Jet Fuel", Renewable and Sustainable Energy Reviews, 79:709-729.

(Continued)

*Primary Examiner* — Ali Z Fadhel
(74) *Attorney, Agent, or Firm* — Morrison & Foerster LLP

(57)　　　　　　　ABSTRACT

The present invention addresses to a process for the integrated production of H₂ and aviation kerosene from renewable raw materials aiming at reducing CO₂ emissions and consequently bringing benefits to reduce the impact of global warming on the planet. The process involves a hydrotreatment section to obtain n-paraffins followed by a hydroisomerization section to produce isoparaffins. The water and light hydrocarbons obtained in the isoparaffin production process are used for the production of H₂ by the steam reforming process. An alcohol, such as ethanol or glycerin, with less than 6 carbon atoms, is fed into the hydrotreating section to make up the light hydrocarbon stream used in the production of renewable hydrogen.

14 Claims, 1 Drawing Sheet

(52) U.S. Cl.

CPC ........................... *C01B 2203/0233* (2013.01); *C01B 2203/062* (2013.01); *C01B 2203/065* (2013.01); *C01B 2203/1211* (2013.01); *C10G 2300/1014* (2013.01); *C10G 2300/1018* (2013.01); *C10G 2300/4081* (2013.01); *C10G 2400/08* (2013.01); *C10L 2200/0484* (2013.01); *C10L 2270/04* (2013.01)

(58) Field of Classification Search

CPC ...... C10G 2400/08; C10G 3/50; C10G 45/58; C10G 49/002; C10G 65/12; C10G 2300/1011; C01B 3/38; C01B 2203/0233; C01B 2203/062; C01B 2203/065; C01B 2203/1211; C01B 2203/0227; C01B 2203/0283; C01B 2203/0415; C01B 2203/043; C01B 2203/0475; C01B 2203/048; C01B 2203/127; C01B 2203/148; C01B 3/34; C10L 1/08; C10L 2200/0484; C10L 2270/04; Y02E 50/10; Y02P 30/20

See application file for complete search history.

(56) References Cited

U.S. PATENT DOCUMENTS

| | | | | |
|---|---|---|---|---|
| 2006/0186020 | A1 | 8/2006 | Gomes | |
| 2007/0186020 | A1 | 8/2007 | Drexler et al. | |
| 2009/0283442 | A1* | 11/2009 | McCall | C10G 3/47 |
| | | | | 208/15 |
| 2009/0294324 | A1* | 12/2009 | Brandvold | C10L 1/06 |
| | | | | 208/78 |
| 2009/0301932 | A1 | 12/2009 | Roberto et al. | |
| 2010/0076238 | A1* | 3/2010 | Brandvold | C10L 1/08 |
| | | | | 585/324 |
| 2011/0105812 | A1* | 5/2011 | Marker | C10L 1/08 |
| | | | | 585/16 |
| 2015/0344382 | A1* | 12/2015 | Eizenga | C07C 1/2078 |
| | | | | 422/187 |

OTHER PUBLICATIONS

Ma et al. (Oct. 1999) "Biodiesel Production: A Review", Bioresource Technology, 70(1):1-15.

"Technical support document for hydrogen production: Proposed rule for mandatory reporting of greenhouse gases", US. Environmental Protection Agency (EPA), 2008.

* cited by examiner

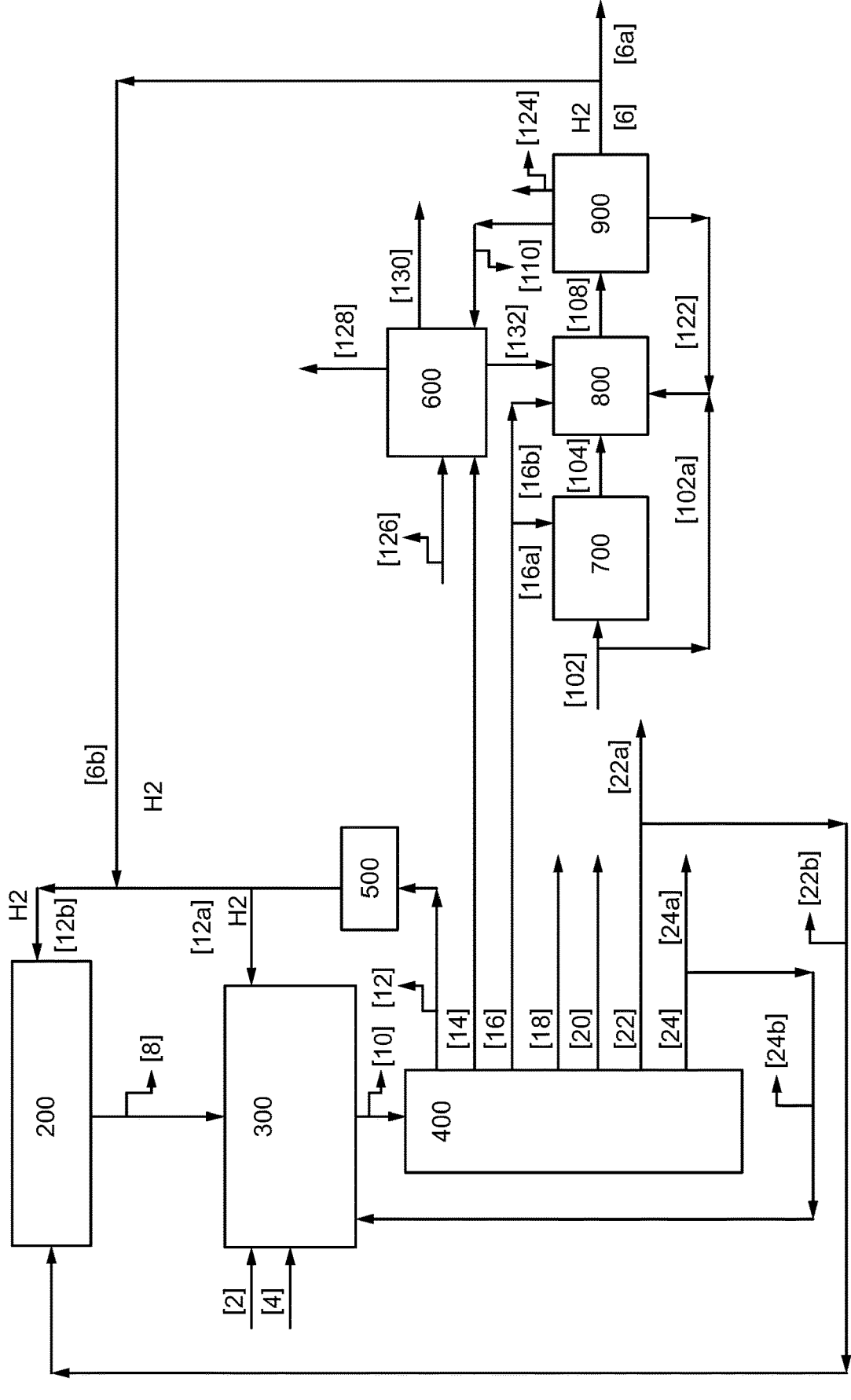

PROCESS FOR THE INTEGRATED PRODUCTION OF H₂ AND AVIATION KEROSENE FROM A RENEWABLE RAW MATERIAL

This application claims priority to Brazilian Application No. 10 2021 015852 2, filed on Aug. 11, 2021, and entitled "PROCESS FOR THE INTEGRATED PRODUCTION OF H2 AND AVIATION KEROSENE FROM A RENEWABLE RAW MATERIAL," the disclosure of which is incorporated herein by reference in its entirety.

FIELD OF THE INVENTION

The present invention addresses to a process for the integrated production of $H_2$ and aviation kerosene, from a renewable raw material, with application in the field of petroleum refining, aiming at reducing $CO_2$ emissions and consequently the impact of refining of oil in the process of global warming of the planet.

DESCRIPTION OF THE STATE OF THE ART

The production of renewable fuels, such as liquefied petroleum gas ("Bio-LPG"), naphtha ("Bio-naphtha"), diesel ("Bio-Diesel") and aviation kerosene ("Bio-JET-A1"), as substitutes or complements of fossil fuels, is a current objective of industry and society, which seeks to reduce the impact of the transport sector on $CO_2$ emissions that contribute to the global warming of the planet.

There are numerous processes taught in the literature for the production of renewable fuels. One of the best known is the production of biodiesel from the chemical reaction (transesterification) of lipids, oils or fats of animal or vegetable origin with an alcohol in the presence of a catalyst, such as alkaline bases like caustic soda. In this process, biodiesel (fatty acid esters) and glycerin are produced as a by-product as described by MA, F.; HANNA, M. A. "Biodiesel Production: a review, Bioresource Technology, v. 70, p. 1-15, 1999. In the transesterification process, an average of about 10 kg of glycerin is produced for 100 kg of produced biodiesel. The purified glycerin can be used in the pharmaceutical, food or cosmetics industry. As the biodiesel industry expands, it becomes necessary to create new uses for glycerin or even give this by-product a destination, including its combustion, composting, anaerobic digestion and use in animal feed.

More recently, aviation kerosene has been the focus of the industry. The International Air Transport Association (IATA) identifies the development of renewable fuels as the best alternative to reduce the impact of the sector, currently estimated at 2% of global $CO_2$ contributions and with prospects of doubling this value in the next 20 years. The use of renewable raw materials in the production of aviation kerosene reduces $CO_2$ emissions in the kerosene production process and makes the product more environmentally sustainable.

The production of renewable aviation kerosene (Bio-JET-A1) can be made from lignocellulosic raw materials by routes such as pyrolysis, hydropyrolysis, gasification followed by Fischer-Tropsch processes and others; from sugars by fermentation and oligomerization routes; and by the hydroprocessing route of fatty acids, fatty acid esters, and triglycerides, such as vegetable oils and animal fats. Although there are numerous teachings in the literature of processes for the production of Bio-JET-A1, the hydroprocessing of triglycerides is currently one of the few ASTM certified processes for the production of Bio-JET-A1 for commercial use.

In a broader teaching, hydroprocessing (or hydrotreating or hydroconversion) for the production of renewable fuels involves the chemical conversion of triglyceride by one or more steps of oxygen removal (hydrodeoxygenation), formation of branched paraffins (hydroisomerization) and hydrocracking reactions, particularly of n-paraffins, at high temperature and pressure, in the presence of hydrogen and using fixed bed catalysts, as described in GUTIERREZ-ANTONIO, C. et al. "A review on the production process of renewable aviation kerosene", Renewable and Sustainable Energy Reviews, v. 79, p. 709-729, 2017. The process conditions and the number of steps may vary depending on the desired characteristics of the fuels. Documents US 2006/0186020A1 and US 2009/0301932A1 teach a process for producing renewable diesel from the hydrotreating of vegetable oils in mixture with fossil charges in conventional hydrotreating units existing in refineries. The hydroconversion reactions can be carried out in the presence of fixed bed catalysts based on metal sulfides of group VI and group VIII, with a pressure from 4 to 10 MPa, average temperatures between 320 and 400° C., space velocities between 0.5 $h^{-1}$ and 2 $h^{-1}$, $H_2$/oil ratios ranging between 200 Nl/l and 1000 Nl/l. In an example of US 2007/0186020A1 it is taught that the process produces 1 liter of diesel, 014 l of water, 18 Nl of methane, 20 Nl of propane from each liter of soy vegetable oil (Soya Oil). When castor oil is used, 0.09 l of water, 15 Nl of methane, 20 Nl of propane and 1 l of diesel are produced for every 1 liter of vegetable oil. U.S. Pat. No. 8,039,682B1 teaches a process for producing hydrocarbons having a boiling point in the range of aviation kerosene from the hydroprocessing of renewable raw materials, such as oils of animal and vegetable origin. The process involves steps of hydrodeoxygenation, hydroisomerization and selective hydrocracking. In an example of this teaching, a yield (% w/w) of 13.7% in $H_2O$ and $CO_2$ is presented; 1.0 in methane, 0.4 in C2 hydrocarbons, 7.0% in C3 hydrocarbons, 3.6% in C4 hydrocarbons, 13.4% in naphtha (BP between nC5 and 132° C.), 54.7% in aviation kerosene (BP between 132° C. and 279° C.) and 10% in diesel (BP above 279° C.). As shown in these teachings, in the hydroprocessing of vegetable or animal oils, varying levels of CO, $CO_2$, $H_2O$ and light hydrocarbons can be formed, in addition to the main products that are hydrocarbons in the distillation range of naphtha, diesel and kerosene (GUTIERREZ-ANTONIO, C. et al. "A review on the production process of renewable aviation kerosene", Renewable and Sustainable Energy Reviews, v. 79, p. 709-729, 2017). The utilization of light hydrocarbons, $CO_2$ and water formed as by-products would further increase the environmental sustainability of the renewable diesel or bio-JET-A1 production process.

Several teachings seek to produce, simultaneously, two main products in the hydroprocessing of vegetable oils. U.S. Pat. No. 8,912,375B2 teaches a process for producing naphtha and diesel from the hydrodeoxygenation of renewable organic materials, selected from triglycerides, fatty acids, acidic resins, fatty acid esters or a combination thereof, using a fixed bed catalyst based on Mo, supported on alumina, silica, titanium or a combination thereof and having a bimodal pore distribution. U.S. Pat. No. 7,846,323B2 teaches a hydroprocessing method for producing aviation kerosene and liquefied petroleum gas (LPG), comprising the steps of hydrotreating the renewable raw material stream to produce a stream of n-paraffins, followed by hydroisomerizing the stream of n-paraffins to produce an isoparaffin fraction and a heavy fraction, separating the heavy fraction from the isoparaffin fraction and recycling the heavy stream to the hydroisomerization step. In the examples of this invention, catalysts of the NiMo/support type, previously sulfided, are used in the hydrotreating step and, next, a catalyst of the Pt/Pd/silica-alumina type is used for hydroisomerization of the n-paraffin fraction in order to adapt the properties of cold flow. WO 2020/083998A1 teaches a process for producing aviation kerosene and diesel from renewable raw materials and which includes hydrodeoxygenation and hydroisomerization steps. Even those processes that aim at producing two or more main products, present significant yields of by-products that need destination or appreciation.

The literature teaches that the yield of products and by-products in the hydroprocessing of vegetable or animal oils is influenced by the operating conditions of fixed bed reactors, such as temperature, pressure and $H_2$/charge ratio; process configuration, which includes hydrodeoxygenation and hydrotreatment steps for the production of renewable diesel, and steps such as hydroisomerization or hydrocracking, for the production of renewable aviation kerosene; and by the catalysts used in the different steps. The production of light hydrocarbon fractions up to the liquefied petroleum gas range is considered undesirable. The increase in the temperature of the process implies an increase in the yield of light hydrocarbons and a reduction in the yield of higher added value fractions, such as diesel and aviation kerosene.

It is also known in the state of the art that a disadvantage of the hydroprocessing route is the high consumption of hydrogen, which increases costs and reduces the potential for reducing $CO_2$ emissions from renewable fuels, since the production of $H_2$ in refineries by the most used process, which is the steam reform of natural gas, emits about 10 ton $CO_2$/ton $H_2$ ("Technical support document for hydrogen production: Proposed rule for mandatory reporting of greenhouse gases", US. Environmental Protection Agency (EPA), 2008). Other processes also industrially used in the production of $H_2$ in large quantities, necessary for hydroprocessing, include the steam reforming of naphtha and coal gasification processes. These processes tend to emit more than 10 ton $CO_2$/ton $H_2$. Although the emitted $CO_2$ can be captured by available technologies, such as the use of amines, its subsequent use in chemical processes or its storage, whether geological or in saline aquifers, it has market and/or technical difficulties, in addition to bringing a significant increase in the production costs of $H_2$. Hydrogen production processes with low $CO_2$ emissions, such as electrolysis and the decomposition of natural gas to $H_2$ and coke using plasma technology, make intensive use of electrical energy, bringing high costs or issues associated with the production of renewable electrical energy.

It is clearly necessary to have a hydroprocessing method that produces renewable fuels, such as diesel or aviation kerosene, integrated with the production of $H_2$ from lower value by-products, thus reducing $CO_2$ emissions when compared to the conventional process of production of fossil fuels.

Document WO 2009/151690A2 teaches a process for producing a hydrocarbon stream in the distillation range of aviation kerosene from renewable raw materials, comprising at least one component selected from vegetable oils, such as canola oil, soy oil, sunflower oil, olive oil and esters of fatty acids and animal fats. The process comprises hydrogenation, deoxygenation, isomerization and selective hydrocracking steps using a multifunctional catalyst or a set of catalysts. The multifunctional catalyst comprises elements selected from the group consisting of noble metals, sulfided metals, zeolites, aluminas and silica-aluminas. The process further comprises separation sections where diesel, aviation kerosene and paraffins are produced, wherein the paraffins having 8 or less carbon atoms are conducted to a steam reforming zone for hydrogen production and this hydrogen is, at least partly, recycled to the reaction zone.

U.S. Pat. No. 8,043,600B2 teaches a process for hydrotreating a hydrocarbon stream containing renewable organic material and a hydrogen stream, using at least one fixed bed catalyst. The effluent from the hydrotreatment reactor is separated into an overhead gaseous fraction and a bottom fraction. The overhead fraction containing CO, $CO_2$, $H_2S$, $NH_3$, $H_2O$ and light hydrocarbons is fed to a shift reactor to convert the CO into $H_2$. The effluent from the shift reactor is cooled with steam generation and sent to a cold separator. In the cold separator, an $H_2$-rich stream is produced, which is routed to an amine section to produce a purified $H_2$ stream, which is partially used for recycling to the hydrotreating section.

Thus, although there are teachings on hydroprocessing processes for the production of diesel or aviation kerosene from renewable raw materials, there is still a need of a process for the production of renewable fuels integrated with the production of renewable $H_2$, which make use of by-products with lower added value, such as methane, ethane, propane and butanes, wherein the yield of these lightweight products is easily adjustable without affecting the yield of the main desired products, namely diesel and aviation kerosene. It is also highly desirable to use other fractions produced in the process of hydrotreating vegetable oils, such as water, thus avoiding costly purification processes and/or intensive use of an increasingly scarce resource. It is further desirable that the process also allows the use of by-products formed in the production of renewable fuels by other routes, such as the glycerin produced as a by-product in the production of biodiesel.

In order to solve such problems, the present invention was developed, by means of which the bio-JET-A1 production by the hydroconversion route is integrated with the production of renewable $H_2$, by the process of steam reforming of light hydrocarbons and water generated as by-products in the aviation kerosene production process (bio-JET-A1). The production of light hydrocarbons necessary for the generation of $H_2$ is independent of the bio-JET-A1 yield, being adjusted by the feeding of a low molecular weight oxygenated hydrocarbon and with up to 6 carbon atoms, such as, but not limited to, ethanol and glycerin, together with renewable raw materials, such as vegetable and animal oils.

Preferably, the $CO_2$ generated in the $H_2$ production step still can be purified and marketed as renewable $CO_2$, replacing $CO_2$ from fossil sources and used in various applications, such as in the food industry for the gasification of beverages; in welding steps in the metallurgical industry; in the expanded plastics industry and in various freezing, cooling and supercritical extraction processes.

The process, object of the present invention, further contemplates a configuration for the hydrotreatment and hydroisomerization reactors in order to obtain a stream of isoparaffins for direct use or for aviation kerosene formulations.

BRIEF DESCRIPTION OF THE INVENTION

The present invention addresses to a process to produce isoparaffins for direct use or for aviation kerosene formulations from renewable raw materials, such as vegetable and animal oils and renewable $H_2$. The process involves a hydrotreating section to obtain n-paraffins that are hydroisomerized in a second section, producing isoparaffins. The water and light hydrocarbons generated in the isoparaffin production process are used for the production of $H_2$, by the steam reforming process. An oxygenated hydrocarbon, preferably alcohol, such as ethanol or glycerin, with less than 6 carbon atoms, is fed into the hydrotreating section to make up the stream of light hydrocarbons used in the production of renewable hydrogen.

BRIEF DESCRIPTION OF DRAWINGS

The present invention will be described in more detail below, with reference to the attached FIGURE which, in a schematic way and not limiting the inventive scope, represents an example of its embodiment.

FIG. 1 illustrates a general flowchart of the production process of isoparaffins for direct use or for aviation kerosene formulations, integrated with the production of $H_2$ from renewable raw materials, as described in the present invention.

DETAILED DESCRIPTION OF THE INVENTION

The process for producing isoparaffins from renewable raw materials, according to the present invention, is illustrated in FIG. 1, and comprises a step of hydrotreating the renewable raw material, carried out in the presence of a fixed bed catalyst and $H_2$ produced from renewable sources. In the hydrotreating step, a stream of heavy hydrocarbons and a stream of light hydrocarbons are produced. The heavy hydrocarbon stream, consisting mainly of n-paraffins, is sent to the hydrocracking and hydroisomerization step, in the presence of a second catalyst and renewable $H_2$, where isoparaffins are then produced for direct use or for the composition of streams of aviation kerosene, after separating the other produced fractions. The light fraction of the hydrotreatment step is used, in a third step, for the production of renewable $H_2$ that is recycled to the process. The hydroisomerization step also produces a stream of light hydrocarbons that can make up the charge used for the production of renewable $H_2$.

The renewable raw material for the production of isoparaffins includes vegetable oils, animal fats, fatty acids and discarded oils from food frying and a mixture thereof. Preferably, the renewable raw material comprises vegetable oils selected from, but not limited to, soybean, canola (rapeseed), sunflower, peanut, cotton, palm, palm kernel, coconut, olive, corn, babassu, castor, sesame, linseed and a mixture thereof. Vegetable oils that have a low degree of unsaturation are particularly useful, characterized by an iodine number lower than 100, such as palm, olive and peanut oil, since they reduce the consumption of hydrogen in the hydrotreatment step for the production of n-paraffins. These oils also have a high concentration of fatty acids with C12 to C16 hydrocarbon chains, which is desirable to avoid the need for greater severity in the hydroisomerization section to adapt the desired properties of the kerosene, such as the final boiling point (maximum of 300° C., by current Brazilian legislation) and the freezing point (maximum of −47° C., by current Brazilian legislation).

A low molecular weight oxygenated hydrocarbon is introduced into the process, preferably in the hydrotreatment step, which can done be together with the renewable raw material or at another point along the reactor, to generate light paraffins that will make up the charge for the production of renewable hydrogen. Although the oxygenated hydrocarbon can be introduced into the hydroisomerization and hydrocracking reactor, such a configuration is not preferred, as ethanol or other alcohols can form various hydrocarbons including aromatic compounds, especially at lower hydrogen partial pressures, in the presence of noble metal-type catalysts/zeolites used in the hydroisomerization section. Such products can bring greater complexity to the isoparaffin separation process and an increase in the catalyst deactivation rate. However, such a configuration can be useful when it is desired to increase the octane rating of the naphtha fraction produced in the isoparaffin production process. The oxygenated hydrocarbon has 6 or less carbon atoms in its structure, preferably the oxygenated hydrocarbon is selected from ethanol, glycerin or a mixture thereof. Ethanol is produced on a large scale in Brazil, reaching a production of around 25.6 billion liters in the 2018/2019 harvest. Glycerin, in turn, is a by-product of biodiesel production from the reaction of triglycerides with low molecular weight alcohols, particularly methanol. The biodiesel market in Brazil was 5.9 billion liters in 2019, which is equivalent to the associated production of about 590 million liters of glycerin. This large-scale production provides these alcohols advantages of availability and lower cost for use in the production process of isoparaffins intended for direct use or in aviation kerosene formulations. The ratio between the low molecular weight oxygenated hydrocarbon and the renewable raw material is preferably comprised between 0.01:1 and 0.5:1 m/m, more preferably between 0.05:1 and 0.2:1 m/m. Such a relationship facilitates temperature control in the hydrotreatment reactor.

The incorporation of low molecular weight oxygenated hydrocarbons into the isoparaffins production process allows the demand for raw material for the production of renewable $H_2$ to be met, without the need to use high temperatures in the reactors of the production process of bio-JET-A1 or the use of specific catalysts with greater hydrocracking activity for the production of light products, which solutions that end up reducing the desired yield in the production of isoparaffins used in the formulation of bio-JET-A1. The produced renewable $H_2$ can meet both the consumption of the isoparaffin production process and the $H_2$ demand of other fossil fuel hydrotreatment processes in petroleum refining activities, thus reducing $CO_2$ emissions associated with the life cycle of fossil fuels, such as diesel, gasoline or lubricants.

The impurities that may be present in the low molecular weight oxygenated hydrocarbon can reduce the useful life of the catalyst used in the hydrotreating section, making the unit stop for its replacement more frequent. In the case of ethanol, according to the resolution of the National Petroleum Agency No. 7 of Feb. 21, 2013 (specification of anhydrous or hydrated ethanol sold in Brazil), these contaminants can be iron, sodium, copper and sulfate. The glycerin obtained as a by-product of biodiesel production may also contain alkali metals such as sodium or potassium. Optionally, such raw materials containing contaminants may be used as long as a pre-treatment step of the process charge is included. The pretreatment section can utilize techniques known in the refining industry, such as distillation or purification by ion exchange resins. Renewable raw material, such as vegetable oils, may also contain contaminants such as alkali metals, phosphorus-containing compounds and solids, and may be purified by processes known in the vegetable oil refining industry, such as degumming, neutralization, bleaching and deodorization.

Optionally, a hydrocarbon fraction of fossil origin, such as naphtha, kerosene or diesel, preferably with low sulfur content, more preferably below 10 ppm of sulfur, can also be fed together with the renewable raw material, to act as a reaction moderator and/or adjust the specifications of the fuels produced in the process.

The hydrotreatment step of the renewable raw material and the low molecular weight oxygenated hydrocarbon involves reactions to remove oxygen, with the presence of hydrogen, known as deoxygenation and the hydrogenation of olefins over a fixed bed catalyst. Hydrotreatment catalysts are known in the state of the art, such as those based on mixtures of cobalt and molybdenum oxides; nickel and molybdenum oxides; cobalt and tungsten oxides and nickel and tungsten oxides or mixtures thereof, deposited on alumina. The catalyst can further be promoted by other compounds, such as phosphorus or boron. In industrial practice, such catalysts are previously activated by transforming the phases of metallic oxides into metallic sulfides, in the process known as sulfidation. The sulfidation can be performed by adding a sulfur compound, such as dimethyl disulfide ($CH_3$—$SS$—$CH_3$) or carbon disulfide ($CS_2$), to a hydrocarbon stream, such as n-paraffins. It is further known in the state of the art that, in order to keep the metal sulfide phases stable in the hydrotreating catalyst, it is necessary to maintain the presence of sulfur compounds in the reactor feed. Such compounds are transformed into $H_2S$, which is an undesirable contaminant of light gases formed in the hydrotreating section, when this stream is used in the production of renewable hydrogen by the steam reforming process. Although $H_2S$ can be removed by methods known in the industry, such as the use of amines or the reaction with zinc oxide, the presence of a certain content of sulfur compounds in the reactor feed is desirable in order to maintain the metal sulfides in the catalyst, but not excessively high levels that imply additional costs for their removal. Such contents are preferably comprised between 5 and 15 ppmv of total sulfur in the feed to the hydrotreatment reactor for renewable raw materials. This sulfur can come from a fraction of fossil charge added to the process or by the feeding of hydrocarbons or compounds that produce $H_2S$ under hydrotreating conditions, such as, but not limited to, dimethyl-disulfide and $CS_2$. An alternative solution to reduce the need for purification of the light hydrocarbon stream generated in the production of isoparaffins, when it is used as a raw material for the production of renewable $H_2$, is to use metallic catalysts in the hydrotreatment section. Non-limiting examples include nickel and molybdenum oxide catalysts supported on alumina, cobalt and molybdenum oxides supported on alumina, chromium oxides, copper oxides or mixtures thereof supported on aluminas or aluminas promoted by alkali metals, noble metals such as Pt and Pd, dispersed in a high surface area support, such as transition aluminas. The hydrotreatment step can be carried out at temperatures between 250 and 350° C., pressures between 20 and 100 kgf/cm² (1,961 e 9,807 MPa) and space velocities (on a volumetric basis) between 0.5 and 4.0 h$^{-1}$ and $H_2$/hydrocarbon ratios varying between 150 Nl/l and 1000 Nl/l.

In the hydrotreatment step of the renewable raw material, to a lesser extent, exothermic reactions of methanation of the residual fractions of CO and $CO_2$ may occur. In this way, it is necessary to use a method to control the temperature in the desired range, preferably between 250 and 350° C., more preferably between 280 and 330° C. A preferred method is the use of recycling a part of the hydrotreated product and the injection of $H_2$ at selected points along the catalyst bed, called "quenching" with hydrogen. The ratio between renewable charge and hydrotreated product recycled to the hydrotreatment reactor can vary between 1:0.2 and 1:2 m/m, depending on the properties of the raw material used, such as its degree of unsaturation.

Most of the oxygen present in the renewable raw material, triglycerides or in the low molecular weight oxygenated hydrocarbon, produces water in the hydrotreatment step for the production of isoparaffins. A minority fraction of oxygen produces CO and $CO_2$. The water yield in the renewable kerosene production process can reach typical values between 9 and 13% w/w, influenced by the type of oil, catalyst and operating conditions used in the hydrotreatment step. According to the present invention, it is desirable that this water be used for the production of hydrogen by steam reforming.

The hydrotreating section produces a heavy fraction of n-paraffins from the renewable raw material, such as, but not limited to triglycerides, which is suitable for making up diesel formulations, considering its boiling point. To reduce the boiling point of n-paraffins so that they can make up aviation kerosene formulations, typically with initial boiling point around 130° C., end point around 300° C. and adjusting the freezing point, it is necessary to carry out a reaction of hydroisomerization for the production of isoparaffins and, depending on the triglyceride used, also promote a selective breakdown by hydrocracking reactions, preferably of paraffins with a longer chain. Hydrocracking reactions must not be excessive, as they can lead to a drop in the yield of higher added value products, such as aviation kerosene and diesel, with an increase in the yield of light products, such as naphtha and liquefied petroleum gas.

The hydrocracking and hydroisomerization section can use catalysts based on aluminosilicates or silicoaluminophosphates with pore structure of regular dimensions. There are more than 200 different structures, varying their properties, such as channel dimensions, channel nature (interconnected, linear and others), type of cavities formed between the channels, presence of heteroatoms, such as titanium, germanium, boron, gallium, cobalt and others, in the crystal structure. Particularly useful are materials with cavity dimensions between 0.39 and 0.60 nm, such as, but not limited to, structures classified in the Atlas of Zeolite Framework Types as MFI (such as ZSM5 zeolite which has tubular channels interconnected with pores of 0.51×0.55 nm and 0.53×0.56 nm), MFS (such as ZSM-57 zeolite with one-dimensional tubular channels of 0.51×0.54 nm and 3.3×4.8 nm), MEL (such as ZSM11 zeolite with three-dimensional tubular channels with pores of 0.53×0.54 nm), MTT (such as ZSM23 zeolite with one-dimensional channels with dimensions of 0.45×0.52 nm), MTW (such as ZSM12 zeolite with one-dimensional channels of 0.56×0.60 nm), TON (such as ZSM22 zeolite with pore sizes of 0.41×0.57 nm). These materials are particularly useful as they utilize shape selectivity, a known property of zeolites. The n-paraffins have molecular dimensions around 0.42 nm; isoparaffins with a methyl substitution (mono-branched) have dimensions around 0.55 nm; isoparaffins with two substitutions (bi-branched) have dimensions around 0.55 to 0.71, depending on the location of the branches. On the other hand, paraffins with three methyl branches (tri-branched) have a molecular size around 0.67 nm. Thus, the use of zeolites with cavity dimensions between 0.40 and 0.60 nm allows isoparaffins to be formed, preferably with a single branch, which reduces undesirable hydrocracking, since it is also known in the literature that bi- and tri-branched have a higher hydrocracking rate than mono-branched isoparaffins.

In addition to the type of crystal structure of the catalysts used in the hydroisomerization and hydrocracking section, another property that affects the relationship between hydroisomerization and hydrocracking is the acidity of the zeolite. To be active in hydroisomerization reactions, zeolitic materials must be in their acidic form, that is, the alkali metals typically used in their synthesis and incorporated into their structure, such as Na or K, must be replaced by ion exchange with $H^+$ cations or alkaline earth cations, such as calcium or magnesium or other cations that can hydrolyze and generate acidic sites. However, a very high acid strength will tend to favor hydrocracking reactions over hydroisomerization reactions. Thus, it is particularly useful to use molecular sieves with their acid strength reduced by the incorporation of phosphorus in their crystalline structure, which allows using a greater extension of pore size, such as between 0.39 and 0.70 nm, which examples are, but not limited to the silicoaluminophosphates SAPO11 (pores with dimensions of 0.39×0.63 nm), SAPO31 (0.54 nm×0.54 nm) and SAPO41 (0.43 nm×0.70 nm). A limitation of the use of these silicoaluminophosphate materials is that they are not yet produced and marketed on a large scale, as is the case with zeolites (also called aluminosilicates) of type Y, Beta, Mordenite, ZSM5 and Ferrierite. Thus, it is advantageous to alter the pore structure and/or acid strength of these zeolites to obtain greater selectivity for hydroisomerization reactions over hydrocracking reactions. Particularly useful are zeolites of the HZSM5 type, in which part of the aluminum in the lattice has been replaced by Fe (ferrosilicates) or boron (borosilicates), and Beta zeolite (which has one-dimensional channels with dimensions of 0.56×0.56 nm and two-dimensional channels with dimensions of 0.66×0.67 nm) with its acid strength reduced by ion exchange with lithium or by impregnation with phosphoric acid. Another solution that can be used to control the acidity of zeolite for the formulation of hydroisomerization and hydrocracking catalysts is the addition of nitrogen compounds to the renewable raw material, such as, but not limited to, methyl-amine, ethyl-amines and propyl-amines at contents between 10 and 1000 ppm, preferably between 50 and 300 ppm.

The catalyst of the hydroisomerization and hydrocracking section consists, in addition to the zeolite phase, of a metallic phase, selected from Pt, Pd, Ni or a combination of these elements, in contents preferably between 0.2 and 2.0% w/w, more preferably between 0.5 and 1.0% w/w. The metal can be incorporated into the zeolite by the ion exchange technique in aqueous solution or by the impregnation technique using metallic salts soluble in polar solvents, followed by drying and calcination steps in air. The final catalyst must have adequate dimensions to allow the flow of the liquid and gas phase, with an adequate pressure drop for the process. Typical dimensions are extruded from 1 to 3 mm in diameter, and may have, but are not limited to, cylindrical, trilobe or quadrilobe shapes. To allow the material to be extruded and the catalyst particles to have adequate mechanical strength, a binding agent can be added to the catalyst formulation, at levels below 10% w/w, preferably below 5% w/w, such as, but not limited to, aluminum compounds that in the calcination steps will be transformed into alumina. It is further advantageous to increase the yield of isomerized products to use two or more catalysts based on different zeolites in the hydroisomerization and hydrocracking section; particularly useful is a first section containing a zeolite with high selectivity for the formation of isoparaffins with one or two branches and a second section with a zeolite that has no restrictions for the entry into its pores of hydrocarbons with two branches.

As taught in the literature, a behavior observed in numerous hydroisomerization and hydrocracking catalysts is the reduction of the yield in isomerized products of higher molecular weight with the increase of the conversion of n-paraffins, especially for the hydroisomerization of high molecular weight paraffins, such as those arising from the hydrotreating of triglycerides that typically have linear chains with 12 to 18 carbon atoms. Thus, it is advantageous to maintain the conversion of n-paraffins at values below 80%, preferably below 60%, when it is desired to increase the ratio between hydroisomerized and hydrocracked products. The unconverted paraffin can be separated and used for diesel formulation or recycled to the hydroisomerization and hydrocracking section, when it is desired to increase the production of isoparaffins for use in aviation kerosene or to increase the production of liquefied petroleum gas or naphtha from renewable raw material. The hydroisomerization and hydrocracking step can be carried out at temperatures between 150 and 350° C., pressures between 20 and 100 kgf/cm² (1,961 e 9,807 MPa), space velocities (on a volumetric basis) between 0.5 and 4.0 h⁻¹ and $H_2$/hydrocarbon ratios ranging from 150 Nl/l and 1000 Nl/l.

As can be seen in FIG. 1, the general flowchart of the process is presented, where the renewable raw material (stream 2), which includes vegetable oils, animal fats, fatty acids and oils discarded from food frying and mixture thereof, is fed to the hydrotreating reactor (300) together with an oxygenated hydrocarbon (stream 4) of low molecular weight, selected from ethanol, glycerin or a mixture thereof. Hydrogen (stream 6b) from the steam reforming process from renewable hydrocarbons, together with the $H_2$ effluent from the separation section (400), is compressed (500) and recycled to the hydrotreatment reactor (300) and to the hydroisomerization and hydrocracking reactor (200). To moderate the exothermic reactions that occur in the hydrotreatment reactor, the product of the hydroisomerization and hydrocracking reactor (200) is used, which is also fed to the hydrotreatment reactor (stream 8). Hydrogen can further be fed at more than one position along the hydrotreating reactor bed to control the reactor temperature rise due to exothermic reactions. In the hydrotreatment reactor (300), oxygen removal (deoxygenation) and double bond hydrogenation reactions and, to a lesser extent, cracking reactions take place. The product of the hydrotreatment reactor (stream 10) consists of n-paraffins, propane, water, CO, $CO_2$, methane and ethane from the reactions of the renewable raw material and ethane, propane, butane, pentanes and/or hexanes, derived from of low molecular weight oxygenated hydrocarbon. The operating conditions of the hydrotreatment reactor (temperature, pressure, space velocity, $H_2$/charge ratio and type of catalyst) are chosen so that the oxygen removal is above 95%, preferably 100%. The reactor product still contains the products of the hydroisomerization and hydrocracking reactor (200), which are isoparaffins, unconverted n-paraffins and lower molecular weight paraffinic hydrocarbons fed to the reactor to moderate the exothermicity of the reaction. The effluent (10) from the hydrotreatment reactor (300) goes to the separation section, where a hydrogen-rich stream (12) is obtained, containing low concentrations of hydrocarbons, CO and $CO_2$, which is recycled to the hydrotreatment reactor (300) and for the hydroisomerization and hydrocracking reactors (200); an aqueous stream, which may contain $CO_2$ and low molecular weight alcohols (14), which is fed into the steam generation section (600) of the $H_2$ production process; a light hydrocarbon stream (16), containing methane, ethane, propane, butanes and minor contents of CO and $CO_2$, which is fed as a charge (16a) in the pre-treatment section (700) and, optionally, used as a fuel (16b) in the reform section (800) of the $H_2$ production process; a stream of naphtha (18); a stream that can be used directly or in aviation kerosene formulations (20); a stream that can be used pure or in diesel formulations (22) and a hydrocarbon stream with boiling point above diesel (24). The diesel stream (22b) can be used as renewable diesel or it can be recycled to the hydroisomerization and hydrocracking reactor (200), and the heavy products stream (24b) can be recycled to the hydrotreating reactor (300) to increase its conversion into products of greater interest, such as isoparaffins.

Hydrogen is produced by the steam reforming process, from hydrocarbons from renewable raw materials. The light hydrocarbon stream (16a) such as methane, ethane, propane, butanes, CO and $CO_2$ is fed into the pre-treatment section (700) together with recycle $H_2$ (not shown), this at typical levels of 2 to 6% molar. Natural gas, liquefied petroleum gas, refinery gas or naphtha (stream 102) can also be fed into the pretreatment reactor (700). This is particularly useful when there is a hydrogen production unit in the refinery with a greater capacity than the hydrogen required for the isoparaffin production process. The pre-treatment section has a typical configuration of a first catalytic bed for hydrodesulfurization, with CoMo/alumina or NiMo/alumina catalysts, followed by one or more beds of zinc oxide. The beds can be contained in one or more reactors depending on the capacity of the unit. The mixture of hydrocarbons, $H_2$ and water vapor is then fed into the reform and shift section (800). The effluent from the reform and shift section (800) is a stream (108) containing $H_2$, CO, $CO_2$, $CH_4$ and water vapor that is sent to the separation section, which uses the "Pressure swing adsorption" technology. (900). In the separation section, a $H_2$ rich stream (6b) is produced, which is used in the production process of isoparaffins. The separation section (900) further produces an aqueous stream (110), containing $CO_2$ and minor levels of oxygenates and other contaminants that is sent to the steam generation section (600); and a stream (122) containing $H_2$, CO, $CO_2$ and $CH_4$ that is used as fuel in the reform and shift section (800).

Alternatively, the separation section can use amine technology, when then a stream with a typical purity greater than 99% in $CO_2$ (124) is separated, which can be used for the production of chemicals, for the gasification of beverages or correctly disposed. In the steam generation section (600), the steam necessary for the $H_2$ production process (132) is produced and a fraction of the generated steam is exported for use in other processes (130). Steam is generated from the condensate of the $H_2$ production process (110), from the aqueous stream (14) generated in the isoparaffin production process and boiler water (126). The stream (128), containing $CO_2$, water vapor and residual levels of by-products such as amines or methanol, is sent for treatment (not shown).

EXAMPLES OF THE INVENTION

The following examples are presented in order to illustrate the present invention and its application, without, however, limiting its content.

Example 1

This example illustrates the conversion of a vegetable oil in a hydrotreatment reactor.

Soybean oil was hydrotreated at 80 kgf/cm$^2$ (7,845 MPa), reaction temperature between 381 and 322° C. and WHSV of 1 h$^{-1}$ using a commercial NiMo/alumina catalyst. The conversion of vegetable oil, determined by chromatography, was 100%, with an estimated consumption of 340 Nm$^3$ $H_2$/m$^3$ of soybean oil. The yield of the products was 32.41% m/m for C17 n-paraffins (17 carbon atoms in the chain), 51.79% m/m for C18 n-paraffins (18 carbon atoms in the chain), 84.2% m/m, having also formed methane (1.92% m/m), propane (4.87% m/m), CO (0.25% m/m) and $CO_2$ (0.25% m/m) and $H_2O$ (11.81% m/m).

Considering that soybean oil consists of almost 90% by weight of triglycerides formed from fatty acids with 18 carbon atoms per molecule (stearic, oleic, linoleic and linolenic acids) and without the presence of fatty acids of 17 carbon atoms, the high yield of n-paraffins with 18 carbon atoms per molecule indicates that the removal of oxygen from the molecule occurred preferentially without the formation of $CO_2$. In turn, the formation of methane can be associated with the reaction of CO and/or $CO_2$ with hydrogen, in the reaction known as methanation.

Example 2

This example illustrates suitable catalysts for use in the hydroisomerization and hydrocracking section according to the present invention.

A zeolite of the HBeta type (SudChemie H-B25) was impregnated with an aqueous solution of phosphoric acid in order to present phosphorus contents of 1.5; 3.0; 6.0 and 8.3% followed by washing and calcination steps at 450° C. The modified zeolite was then mechanically mixed with a Pt/Alumina sample containing 1% Pt in a 1:1 w/w ratio. The hydroisomerization and hydrocracking of n-decane were carried out at temperatures of 300° C. and $H_2$/n-decane molar ratio of 56 mol/mol. The activity of the catalyst was estimated based on the apparent constant of the reaction rate, considering 1$^{st}$ order kinetics, and the selectivity estimated from the distribution of products obtained by gas chromatography. At 70% n-decane conversion, the selectivity for isodecanes was 85% m/m; 70% m/m, 60% m/m, 45% m/m and 20% m/m for the phosphorus contents in the HBeta zeolite of 8.3%; 6.0%, 3.0% and 1.5% and 0% m/m, respectively.

It should be noted that, although the present invention has been described in relation to the attached drawings, it may undergo modifications and adaptations by technicians skilled on the subject, depending on the specific situation, but provided that it is within the inventive scope defined herein.

The invention claimed is:

1. A process for integrated production of $H_2$ and aviation kerosene from a renewable raw material, the process comprising:

(a) reacting, in a hydrotreating section, in the presence of $H_2$ and a catalyst in a fixed bed, a mixture of renewable raw material and an oxygenated hydrocarbon of up to 6 carbon atoms diluted with a product to produce a stream containing n-paraffins and isoparaffins with 12 to 18 carbon atoms, and a stream of light products;

(b) hydroisomerizing and hydrocracking, in a hydroisomerization and hydrocracking section, at least a portion of the n-paraffins produced in the presence of $H_2$ and a fixed bed selective catalyst to produce a stream containing isoparaffins and the product;

(c) separating, in a separation section, the stream containing n-paraffins and isoparaffins with 12 to 18 carbon atoms and the stream of light products into an aqueous stream, a hydrocarbon stream with a chain size of up to 6 carbon atoms, a stream in a naphtha distillation range, a stream in a distillation range of the aviation kerosene, a stream in a distillation range of diesel and a heavy material stream;

(d) recycling a part of the heavy material stream to the hydrotreating section and a fraction of the diesel stream to the hydroisomerization and hydrocracking section;

(e) using the aqueous stream for generation of steam for production of hydrogen by steam reforming and the hydrocarbon stream with the chain size of up to 6 carbon atoms as charge, and optionally as fuel for the production of hydrogen by steam reforming;

(f) recycling at least a part of the hydrogen produced by steam reforming for producing n-paraffins in the hydrotreating section and for producing isoparaffins in the hydroisomerization and hydrocracking section.

2. The process of claim 1, wherein the renewable raw material is selected from vegetable oils, animal oils and fats, fatty acids, or a mixture thereof.

3. The process of claim 2, wherein the renewable raw material is vegetable oils with an iodine number less than 100 and with a concentration of fatty acids with a C12 to C16 hydrocarbon chain.

4. The process of claim 1, wherein the oxygenated hydrocarbon of up to 6 carbon atoms is selected from ethanol, glycerin, or a mixture thereof.

5. The process of claim 1, wherein a ratio between the oxygenated hydrocarbon and the renewable raw material is between 0.01:1 and 0.5:1 m/m.

6. The process of claim 5, wherein the ratio between the oxygenated hydrocarbon and the renewable raw material is between 0.05:1 and 0.2:1 m/m.

7. The process of claim 1, wherein the catalyst in the fixed bed is selected from nickel and molybdenum oxides supported on alumina, cobalt and molybdenum oxides supported on alumina, chromium oxides, copper oxides or mixtures thereof supported in aluminas or aluminas promoted by alkali metals, noble metals dispersed in a surface area support.

8. The process of claim 1, wherein the fixed bed selective catalyst comprises a zeolite phase and a metallic phase, selected from Pt, Pd, Ni or a combination of these elements, in contents between 0.2 and 2.0% w/w.

9. The process of claim 8, wherein the fixed bed selective catalyst comprises the zeolite phase and the metallic phase, selected from Pt, Pd, Ni, or a combination of these elements, in contents between 0.5 and 1.0% w/w.

10. The process of claim 8, wherein the fixed bed selective catalyst comprises at least 90% Beta zeolite containing 1 to 10% m/m phosphorus.

11. The process of claim 1, wherein reacting in the hydrotreating section is carried out at temperatures between 25° and 350° C., pressures between 20 and 100 kgf/cm$^2$, space speeds on a volumetric basis between 0.5 and 4.0 h$^{-1}$, and H$_2$/hydrocarbon ratios between 150 and 1000 Nm$^3$/m$^3$ of charge.

12. The process of claim 1, wherein hydroisomerizing and hydrocracking is conducted at temperatures between 15° and 300° C., pressures between 20 and 100 kgf/cm$^2$, space speeds on a volumetric basis between 0.5 and 4.0 h$^{-1}$, and H$_2$/hydrocarbon ratios between 150 and 1000 Nm$^3$/m$^3$ of charge.

13. The process of claim 3, wherein the fatty acids comprise palm oil, olive oil, or peanut oil.

14. The process of claim 7, wherein the noble metals comprise Pt or Pd, and wherein the surface area support comprises a transition alumina.

* * * * *